United States Patent [19]
Bazhaw

[11] 3,716,923
[45] Feb. 20, 1973

[54] SURVEYING APPARATUS
[75] Inventor: Willis O. Bazhaw, Dallas, Tex.
[73] Assignee: Hunt Oil Company, Dallas, Tex.
[22] Filed: July 16, 1970
[21] Appl. No.: 55,373

[52] U.S. Cl..................................33/264, 33/295
[51] Int. Cl. ..........................................G01c 15/06
[58] Field of Search........33/72, 73, 74, 46 R, 46 AT, 33/69, 264, 295

[56] References Cited

UNITED STATES PATENTS

| | | |
|---|---|---|
| 2,249,707 | 7/1941 | Frost.....................................33/74 B |
| 1,476,077 | 12/1923 | Hort...................................33/46 AT |
| 2,590,115 | 3/1952 | Merriam, Jr. et al. ................33/72 R |
| 2,277,505 | 3/1942 | Barker et al...........................73/382 |

*Primary Examiner*—William D. Martin, Jr.
*Attorney*—Giles C. Clegg, Jr.

[57] ABSTRACT

Disclosed is a surveying method and apparatus including a self-powered mobile target rod carrier and rotatable target rod with calibrated means for measuring horizontal angles. The mobile vehicle also includes a retractable table for placing gravity measuring equipment on the terrain at the data point and determining the elevation of the target above the point at which the data is taken.

7 Claims, 7 Drawing Figures

PATENTED FEB 20 1973 3,716,923

INVENTOR
WILLIS O. BAZHAW

ATTORNEY

INVENTOR
WILLIS O. BAZHAW
ATTORNEY

INVENTOR
WILLIS O. BAZHAW

ATTORNEY

SURVEYING APPARATUS

This invention relates to surveying apparatus and systems. More particularly it relates to mobile field surveying equipment and methods for obtaining topographic and/or contour data, and particularly to a mobile target rod used in connection with such surveying equipment and methods.

In the conventional surveying process topographic or contour surveys are performed utilizing a surveyor's transit and a target. The target is mounted on a rod which is removed a distance from the transit and the distance therebetween determined. The elevational difference in the transit base and the target is also determined.

The conventional surveying crew includes a surveyor and a rod man. The rod man carries the target rod to the points selected by the surveyor and holds the target rod at selected points while the surveyor takes the desired data concerning distance, elevation and direction. Conventionally the rod man drives a stake at the position where the data point was taken so a later crew may make gravity measurements at the same location. The target rod is then moved to another location and the process repeated until all the required data points have been taken. The horizontal angle between lines interconnecting the rod locations and the transit are measured by the horizontal rotation of the transit, thus providing the surveyor with sufficient information to determine location and elevation of each data point.

Conventionally the azimuthal bearing of the rod from the transit is also determined by reference to a magnetic compass. Thereby the location of the initial transit site and the remote data points may be readily determined.

As will be readily apparent such conventional surveying techniques can be slow and tedious since a rod man is usually assigned the duty of carrying the target rod to various locations and must content with such difficulties as pests, weeds, brush and the like. Furthermore, the rod man is usually required to drive a stake at the point where the data was taken to identify the point for a later crew which determines gravity at the same location. Survey stakes are often difficult to relocate and may be accidentally removed prior to the time the gravity crew arrives at the scene.

In accordance with the present invention a surveying system is provided in which both the transit and the target rod are mounted on mobile carriers and elevated above the terrain a sufficient distance to substantially avoid interference by weeds, brush and the like. Since the rod man rides a self-powered vehicle, the target rod may be rapidly moved to the desired location without undue effort on the part of the crew. Furthermore, gravity determining means may be readily mounted within the mobile vehicle to simultaneously record gravity measurements at each location where a surveying data point is taken. Accordingly, the need for driving stakes and relocating each staked point to take gravity readings is obviated. Since the target rod is carried on a mobile vehicle, the rod may be maintained vertical by mechanical means and thus is more stable than a hand-held target rod.

Other features and advantages of the invention will become more readily understood from the following detailed description taken in connection with the appended claims and attached drawings in which:

Figure 2:
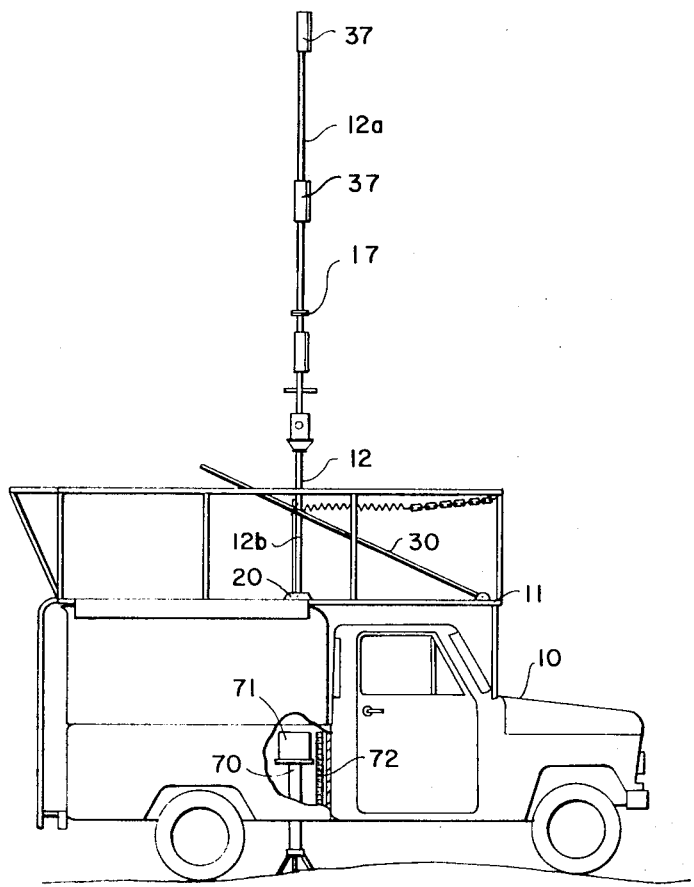
FIG. 2 is a side elevational view of the mobile target rod of the invention.

In accordance with the preferred embodiment of the invention, a conventional surveyor's transit is mounted on a mobile platform such as illustrated in FIG. 2.

The mobile platform for the surveyor's transit may be a mobile elevated platform with means provided to stabilize same. Preferably, the surveyor's vehicle is a truck with a horizontally mounted elevated platform. A conventional transit tripod can be mounted on the platform and suitable conventional means such as retractable jacks, blocks, or other conventional means provided to stabilize the surveyor's platform. The platform need only be stable enough to allow the surveyor to set his transit tripod and maintain it level while taking the desired measurements. As will be described, in accordance with the preferred method of the invention the elevation of the transit above the terrain need not be determined.

Figure 3:
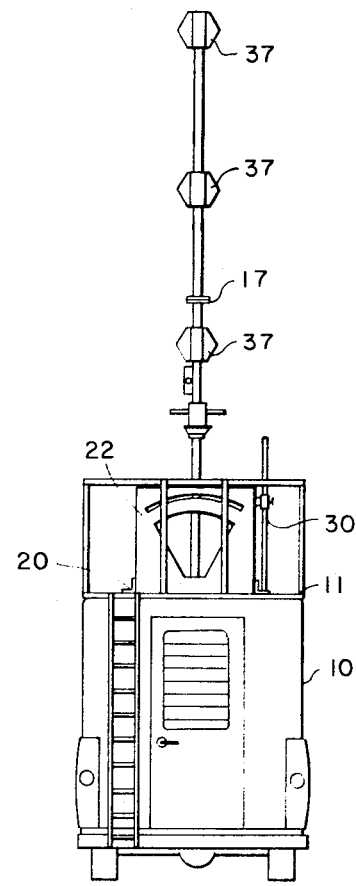
FIG. 3 is a rear elevational view of the mobile target rod and platform.

The target rod is also mounted on a mobile vehicle. The target rod must be held vertical irrespective of the attitude of the platform upon which it is carried. Accordingly, the rod is mounted upon a nonrotatable swivel base as illustrated in FIGS. 2 and 3. The mobile platform is preferably mounted on a vehicle such as truck 10 and comprises an elevated platform 11 preferably mounted horizontally on the truck body. Approximately centrally located on the platform 11 is a vertically extendable target rod 12. The target rod 12 is preferably mounted on a pivotal mounting firmly secured to the platform 11.

Figure 4:
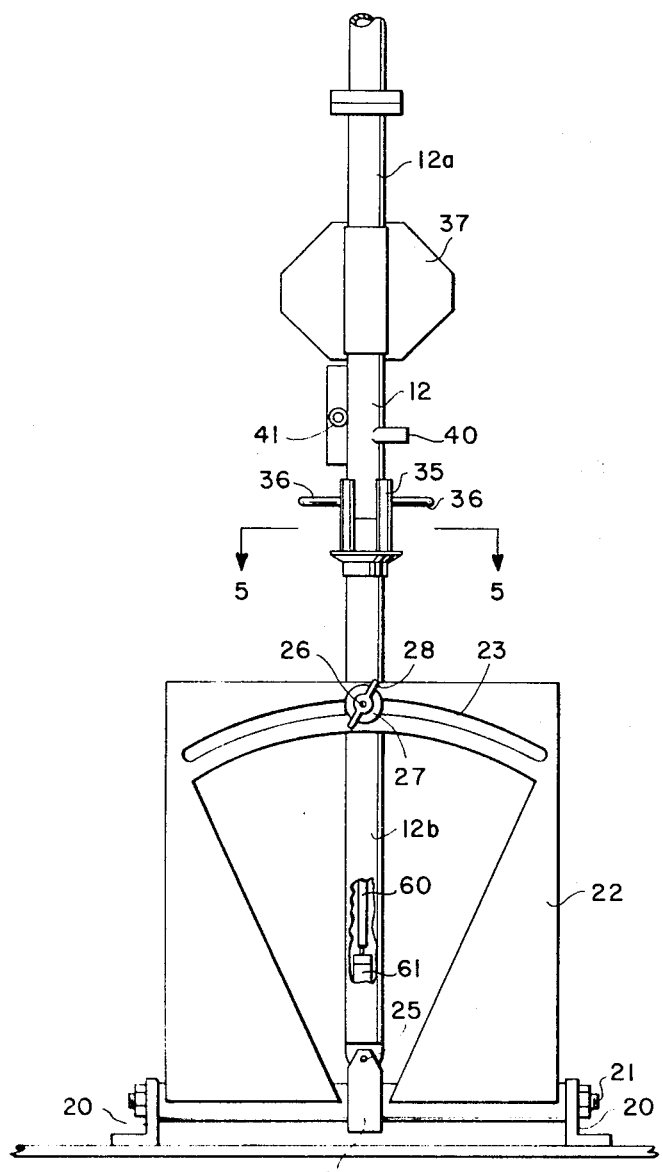
FIG. 4 is a fragmentary view of the collapsible portion of the mobile target rod.
Figure 6:
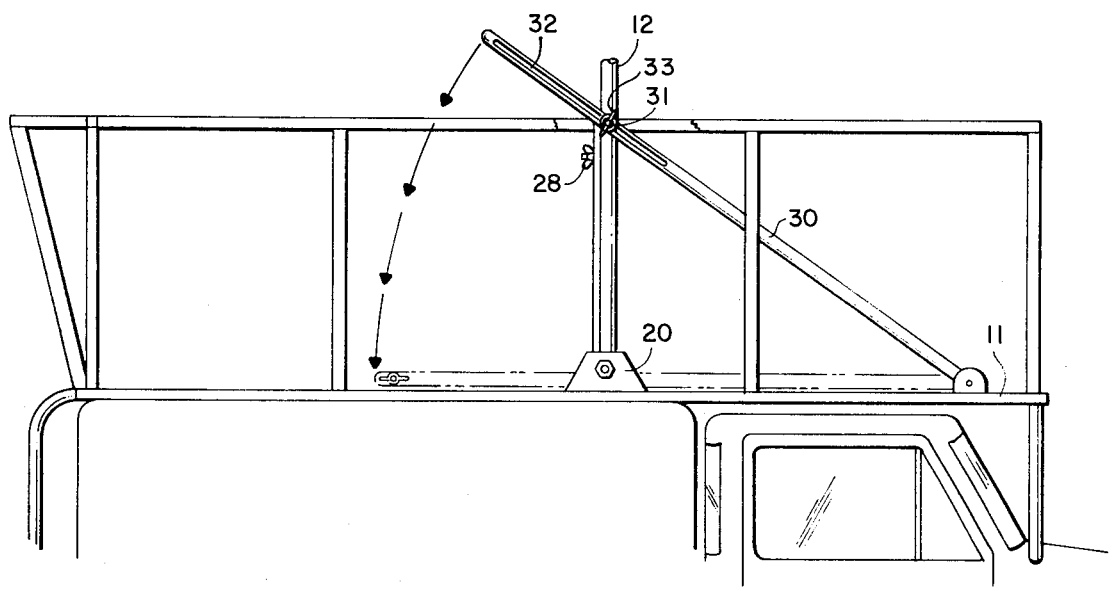
FIG. 6 is a fragmentary side view of the mobile target rod and platform illustrating the collapsible target rod support.

Referring now to FIGS. 4 and 6, the preferred embodiment of the pivotal mounting is illustrated. The mounting comprises a pair of opposed mounting lugs 20 secured to the floor of the platform 11 and interconnected by pivot rod 21. Vertically extending flange 22 is hinged on rod 21 between lugs 20. Flange 22 has an arcuate slot 23 near the end opposite the mounting lugs.

A base support 24 centrally located on pivot rod 21 is adapted to receive the base of rod 12. Rod 12 is secured to base support 24 by means of pin 25 passing through both the rod 12 and base support 24. A threaded clamping pin 26 passes through the target rod 12 at a distance removed from the base thereof to coincide with the slot 23 in flange 22 so that as the target rod 12 is moved laterally clamping pin 26 traverses the slot 23. The rod 12 may be clamped in any position within the arc 23 by means of washer 27 and wing nut 28. It will thus be observed that the target rod 12 may be moved laterally by releasing wing nut 28 and moving the rod to the desired position. It will further be observed that since flange 22 is hinged between opposed lugs 20 the entire assembly may be moved forward or backward as desired.

In order to stabilize the target rod 12 in the desired vertical position a slotted beam 30 is provided. Beam 30 is anchored to the floor of the platform 11 at a point forward of the mounting lugs 20. Threaded locking pin 31 extending laterally from one side of flange 22 rides in slot 32 of beam 30. Locking pin 31 is provided with wing nut 33 to lock the flange 22 in the desired position. From the foregoing it will be observed that the rod 12 may be swiveled without rotation upon its pivotal base and locked in any desired attitude with respect to platform 11 by tightening the wing nuts 28 and 33.

Target rod 12 is preferably provided with a leveling device 40 mounted on rod 12. Leveling device 40 is preferably a bull's eye bubble level secured to the rod 12 in a position where the bubble will be centered in the level only when the rod 12 is vertical. Accordingly, the operator may loosen wing nuts 28 and 33 and adjust rod 12 until the rod is vertical as indicated by centering of the bull's eye bubble. When the vertical condition is obtained the wing nuts 28 and 33 are tightened to securely lock the target rod in the vertical position.

Figure 7:
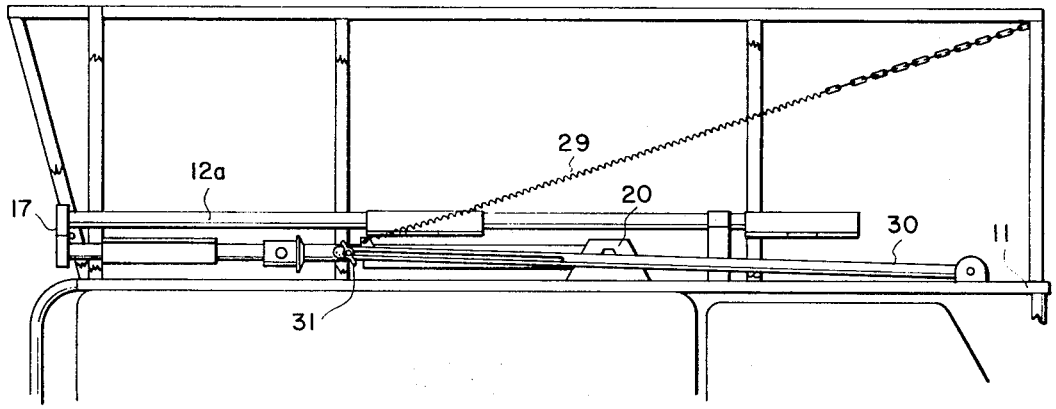
FIG. 7 is a side view of the mobile target rod and platform of the invention illustrating the target rod in the collapsed position.

As indicated in FIGS. 6 and 7, target rod 12 may be provided with one or more hinged joints 17 to allow the rod 12 to be folded for transport. As illustrated in FIG. 6, wing nut 31 may be loosened and the target rod lowered to the horizontal position. The rod 12 is then folded at hinged joint 17 and stored on the floor of the carrier platform 11 for transport. If desired a spring 29 may be suitably stretched between the flange 22 and the platform to assist in erection of the rod 12.

Referring now to FIG. 4, it will be observed that the top section 12a of rod 12 is rotatable with respect to the base section 12b and is provided with a collar 35 which mates with the top of the base section 12b. Collar 35 is provided with opposed hand grips 36 whereby the top section 12a of the target rod may be rotated with respect to the base section 12b. Accordingly, after the rod 12 is anchored in the vertical position, top section 12a may be rotated by the operator until the face of target 37 is normal to the line of sight between the target 37 and the transit. Alignment of target with the transit is obtained by means of a sighting scope 41 mounted on the top section 12a. Sighting scope 41 is affixed to the rod 12a so that the line of sight through sighting scope is normal to the face of target 37. The operator rotates rod 12a by means of hand grips 36 until the transit appears in sighting scope 41. Sighting scope 41 may be pivotally mounted to allow vertical movement of the sighting scope thereby compensating for elevational differences between the target and the transit.

When the target 37 is properly aligned with the surveyor's transit, the distance therebetween is determined by conventional methods. In conventional surveying methods, the position of the target is determined by measuring the distance between transit and target and determining the bearing of the target from the transit with a magnetic compass. However, since the transit is mounted on a self-propelled vehicle, a magnetic compass cannot be effectively used. Accordingly, alternate means must be provided.

In using the apparatus of this invention the location of the first data point must be determined by reference to a known landmark. This may be accomplished by placing the transit over a point of known location and elevation, or by determining the original transit point by other conventional methods. Once the original location of the transit is determined, no other landmark references are required and compass readings are not required to determine horizontal angles. Instead of using a magnetic compass, means are provided on the vertical rod to determine horizontal angles as will be described hereinafter.

Figure 1:
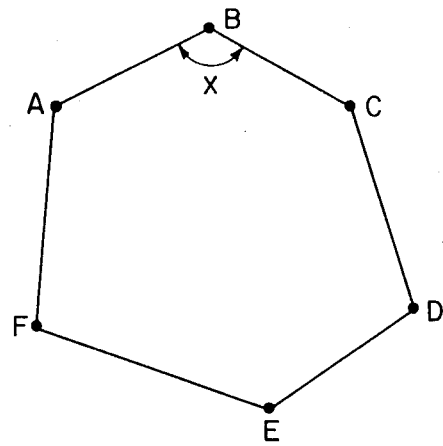
FIG. 1 illustrates a surveying course comprising the points A-F.

Use of the apparatus to obtain surveying data will be described with reference to FIG. 1. The platform with the surveyor's transit is positioned at a first location on the terrain to be surveyed such as indicated at point A in FIG. 1. The position and elevation of point A must be known or determined by conventional methods. The target carrier assumes a position removed from the position of the transit such as point B. The target rod is then erected and the distance separating the transit and the target rod and elevational difference between the surveyor's transit and the target are determined. Conventional methods may be used for such determinations. The target carrier remains stationary and the surveyor's transit platform then moved to a second position such as point C in FIG. 1 and the process repeated. The azimuthal deviation between the lines interconnecting points A and B and points B and C is determined by measuring the angle X therebetween by means provided on the target rod. The target carrier is then moved to point D and the entire process repeated.

Figure 5:
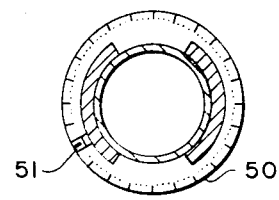
FIG. 5 is a plan view of a portion of the mobile target rod taken through the lines 5—5 of FIG. 4.

In order to determine the horizontal angle between the two locations of the transit with respect to the rod, target rod 12 is provided with a radial disc 50 such as shown in FIG. 5. The radial disc 50 is mounted on target rod 12 immediately below the rotatable section 12a of the rod and is divided into suitable calibrations. A pointer 51 mounted on section 12a adjacent the radial disc 50 may be used to measure the angular rotation of the rod section 12a with respect to base section 12b as the rod 12a is rotated. Thus the desired horizontal angle is measured directly.

As an alternative means for measuring the rotation of top section 12a with respect to base section 12b, top section 12a may be provided with a shaft 60 which extends into the base section 12b. Electronic means for determining relative movement, such as a Selsyn motor 61, is secured to shaft 60. Rotation of top section 12a causes like rotation of shaft 60 which is detected by the Selsyn motor 61. The electrical output of the Selsyn motor 61 is recorded by conventional means to determine the rotation of the target.

The field data obtained by the system of this invention is similar to that obtained by conventional surveying techniques. However, it will be observed that in no case is either the surveyor or the rod man required to leave the mobile platform, thus the surveying can be done very rapidly. Furthermore, since the surveyor and the target rod are mounted at elevated points on mobile carriers, the distance of separation between the target and the transit can be increased since the line of sight separating the target and the transit will not be obstructed by surface growth.

As illustrated in FIG. 2, the mobile target carrier also carries a retractable tripod-mounted table 70 which carries a conventional gravity measuring device 71. Table 70 is positioned on the terrain directly below the base of rod 12 to take gravity measurements simultaneously with the taking of surveying data. It will also be observed that the table 70 may be used to accurately determine the elevation of target 37 above the terrain. For this purpose a linear scale 72 is mounted within the truck 10 below the target rod 12. The distance from the target 37 to any point on scale 72 is constant and may be accurately determined. Likewise the distance from the foot of table 70 to a known point on the table 70 is also constant and may be determined. Due to irregularities in the terrain, the position of the table may vary at different stations. A pointer suitably positioned on table 70 which moves parallel to scale 72 as the table 70 is raised and lowered may be used to measure the actual distance from the terrain at the point directly below the base of the rod to the target 37 since the exact distance will be the sum of the two known distances as indicated on the scale 72.

Table 70 is provided with a suitable retracting mechanism so that table 70 may be easily withdrawn into the carrier for transportation. Upon arrival on the surveying site the table 70 is lowered to the terrain, the gravity measurement taken and the distance from the foot of the table to the target 37 recorded. These data may be taken simultaneously with the other surveying data taken at the location and the table again retracted. The mobile carrier is then ready for relocation at a second point.

From the foregoing it will be observed that using the method and apparatus of this invention, contour and/or topographical data may be collected rapidly and easily without either the surveyor or the rod man leaving the mobile carriers. Furthermore, gravity measurements may be made simultaneously with other measurements, thereby eliminating the need for driving stakes at the points where other data are taken.

It will be noted that elevational data need only be taken at the target points. Since the horizontal angles between all lines interconnecting transit and target points are measured directly, and since the elevation of the target above the terrain is measured at each target point, and the distance between transit and target is measured at each position of both transit and target, sufficient data are collected to prepare any conventional surveying map desired.

While the invention has been described with particular reference to specific embodiments thereof, it is to be understood that the forms of the invention shown and described are to be taken as preferred embodiments of same, and that various changes and modifications may be resorted to without departing from the spirit and scope of the invention as defined by the appended claims.

What is claimed is:
1. A mobile target rod comprising:
  a. A self-powered vehicle;
  b. an elevated platform mounted on said vehicle;
  c. a target rod anchored to said platform;
  d. adjustable means for stabilizing said rod in a vertical position irrespective of the attitude of said platform;
  e. target means secured to said target rod;
  f. means for rotating said rod with respect to said platform;
  g. means for measuring the horizontal angle through which said rod is rotated with respect to said platform;
  h. said adjustable means for stabilizing said rod comprising:
    i. a hinged flange mounted on said platform, said flange having an arcuate slot therein and having means for securing the base of said target rod at the base of said flange;
    ii. a threaded pin secured to said target rod riding in said arcuate slot;
    iii. a beam having one end secured to said platform at a point removed from said hinged flange and extending in the direction of movement of said hinged flange, said beam having a longitudinal slot therein; and
    iv. a threaded pin secured to said hinged flange and riding in said slot in said beam.

2. The mobile target rod defined in claim 1 wherein said means for measuring the angle through which said rod is rotated is a Selsyn motor attached to the base of said rod.

3. The mobile target rod defined in claim 1 wherein said target rod is comprised of a base section and a target section, the target section being rotatable with respect to said base section and the base section being non-rotatable with respect to said platform.

4. The mobile target rod defined in claim 3 wherein said means for measuring the angle through which said rod is rotated comprises:
  i. a calibrated disc surrounding the non-rotatable base section of said rod; and
  ii. pointer means affixed to said target section to cooperatively indicate the rotation of said target section on said disc.

5. The mobile target rod defined in claim 1 and further including a retractable table supported within said self-powered vehicle below the base of said target rod and adapted to be freely positioned on the terrain directly below said target rod.

6. The mobile target rod defined in claim 5 and further including means for measuring the distance from said target to the terrain directly below said target rod.

7. The mobile target rod defined in claim 1 and further including hinge means for folding said rod.

* * * * *